US012692099B2

(12) United States Patent　(10) Patent No.:　US 12,692,099 B2
Fujiwara　(45) Date of Patent:　Jul. 28, 2026

(54) TRANSPORTER

(71) Applicant: Daifuku Co., Ltd., Osaka (JP)

(72) Inventor: Yosuke Fujiwara, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 59 days.

(21) Appl. No.: 19/016,890

(22) Filed: Jan. 10, 2025

(65) Prior Publication Data

US 2025/0229997 A1　Jul. 17, 2025

(30) Foreign Application Priority Data

Jan. 12, 2024　(JP) ................................. 2024-003117

(51) Int. Cl.
　B65G 47/54　　(2006.01)
　B65G 47/61　　(2006.01)
　B65G 47/64　　(2006.01)
　B65G 47/90　　(2006.01)
　B65G 57/06　　(2006.01)
(52) U.S. Cl.
　CPC ........... B65G 47/901 (2013.01); B65G 47/54 (2013.01); B65G 47/61 (2013.01)
(58) Field of Classification Search
　CPC ........ B65G 47/54; B65G 47/61; B65G 47/64; B65G 47/901; B65G 57/06
　USPC .......... 198/456, 346.1, 346.3, 413, 605, 607
　See application file for complete search history.

(56) References Cited

U.S. PATENT DOCUMENTS

| | | | | |
|---|---|---|---|---|
| 3,904,045 | A * | 9/1975 | Thibault .............. | B65G 57/303 414/788.9 |
| 4,199,287 | A * | 4/1980 | Salts .................... | B65G 57/302 414/792.6 |
| 4,493,599 | A * | 1/1985 | Hartness .............. | B65G 59/005 414/796.2 |
| 4,573,862 | A * | 3/1986 | Anderson ........... | B65G 47/901 414/753.1 |
| 4,764,074 | A * | 8/1988 | Postigo ................ | B65G 57/303 414/795.2 |
| 7,726,460 | B2 * | 6/2010 | Neebe .................... | B65G 65/00 198/346.2 |

(Continued)

FOREIGN PATENT DOCUMENTS

| | | | | |
|---|---|---|---|---|
| EP | 0487837 A1 * | 6/1992 | ............. | B65H 31/32 |
| EP | 0790201 B1 * | 10/1999 | ............. | B65G 61/00 |

(Continued)

*Primary Examiner* — Douglas A Hess
(74) *Attorney, Agent, or Firm* — The Webb Law Firm

(57)　　　　ABSTRACT

A transporter transfers a target object to and from a roller conveyor including a plurality of rollers and a support frame. The transporter includes a holder including a support, a restrictor that restricts movement of the target object in a transport direction, and an open-close assembly that opens and closes the restrictor. The open-close assembly includes a movable member and a linkage. The support includes an insert portion placeable, with the holder at a first position, below a transport surface of the roller conveyor through a roller clearance. The movable member is pressed upward by the support to enter a pressed state in response to the holder being lowered from a second position to the first position and is released from pressure from the support frame to enter a released state in response to the holder being raised from the first position to the second position.

4 Claims, 6 Drawing Sheets

(56)                    References Cited

U.S. PATENT DOCUMENTS

| | | | | |
|---|---|---|---|---|
| 8,622,685 B2 * | 1/2014 | Van Schijndel | ....... | B65G 47/90 |
| | | | | 414/789.9 |
| 10,723,566 B2 * | 7/2020 | Jarr | ........................... | B66F 9/02 |
| 11,180,327 B2 * | 11/2021 | Meurer | ................. | B65G 47/82 |
| 12,434,915 B2 * | 10/2025 | Yamada | ................. | B65G 35/06 |
| 12,492,079 B2 * | 12/2025 | Fujiwara | ................ | B65G 17/20 |

FOREIGN PATENT DOCUMENTS

| | | | | | |
|---|---|---|---|---|---|
| EP | | 2258618 B1 * | 8/2013 | ............. | B65B 9/135 |
| JP | | 2006298549 A | 11/2006 | | |
| WO | WO-2023062233 A1 * | | 4/2023 | ........... | B65G 1/1378 |
| WO | WO-2025119767 A1 * | | 6/2025 | ......... | B25J 15/0206 |

\* cited by examiner

TRANSPORTER

CROSS-REFERENCE TO RELATED APPLICATION

This application claims priority to Japanese Patent Application No. 2024-003117 filed Jan. 12, 2024, the disclosure of which is hereby incorporated by reference in its entirety.

BACKGROUND OF THE INVENTION

Field of the Invention

The present invention relates to a transporter.

Description of Related Art

For example, Japanese Unexamined Patent Application Publication No. 2006-298549 (JP 2006-298549) describes a technique for a transporter. Reference signs in parentheses used hereafter in describing the background are the reference signs in JP 2006-298549.

The transporter described in JP 2006-298549 includes a holder (roller conveyor transferrer 120) for holding and transferring a target object (workpiece W). The holder includes a conveyor for supporting and transferring a target object to a loading station (300), a restrictor (stopper 150), and an open-close assembly for switching the restrictor between an open state and a closed state. In the closed state, the restrictor restricts the target object on the conveyor from moving in a transport direction. While the holder is holding a target object, the restrictor is thus in the closed state to prevent the target object from falling off the conveyor. When the target object is transferred between the conveyor and the loading station (300), the restrictor is switched to the open state.

In the transporter described above, the open-close assembly includes no actuator such as an electric motor. More specifically, the open-close assembly includes a movable member (lever 130) movable with the restrictor. A contact member to lift the movable member is disposed adjacent to the loading station (300). When the holder is lowered to a level corresponding to the loading station (300), the contact member comes in contact with and lifts the movable member. This switches the restrictor from the closed state to the open state. When the holder is raised, the movable member returns from the lifted position to its original position under its weight, switching the restrictor from the open state to the closed state.

In the transporter described in JP 2006-298549, the open-close assembly includes no actuator such as an electric motor and can reduce the weight of the transport vehicle. However, to transfer target objects at multiple positions, the above transporter is to include multiple contact members to lift the movable member. Thus, the loading stations for transferring target objects tend to have a complicated structure and to be larger.

SUMMARY OF THE INVENTION

One or more aspects are directed to a transporter that can appropriately transfer target objects with a simple structure.

A transporter according to an aspect of the disclosure is a transporter for transferring a target object to and from a roller conveyor including a plurality of rollers and a support frame supporting the plurality of rollers. The transporter includes a movable body being movable, a holder that holds the target object, and a lifter that raises and lowers the holder with the holder being suspended from the movable body. The holder includes a support that supports the target object, a restrictor that restricts movement of the target object being held in a transport direction in which the roller conveyor transports the target object, and an open-close assembly that opens and closes the restrictor. The lifter raises and lowers the holder in a vertical direction to a first position at which the target object is loaded into and unloaded from the holder by the roller conveyor and to a second position at which the support supports or releases the target object. The second position is above the first position. The restrictor enters an open state in response to the holder at the first position and enters a closed state in response to the holder at the second position. The restrictor in the open state has no overlap with a movement path of the target object transported by the roller conveyor when viewed in the transport direction. The restrictor in the closed state has an overlap with the movement path of the target object when viewed in the transport direction. The open-close assembly includes a movable member and a linkage. The movable member switches between, in response to the holder being raised or lowered, a pressed state in which the movable member is pressed by the support frame and a released state in which the movable member is released from pressure from the support frame. The linkage links the movable member and the restrictor to cause the restrictor to switch from the open state to the closed state in response to the movable member switching from the pressed state to the released state and to cause the restrictor to switch from the closed state to the open state in response to the movable member switching from the released state to the pressed state. The support includes an insert portion placeable, with the holder at the first position, below a transport surface of the roller conveyor through a roller clearance between a pair of rollers, among the plurality of rollers, adjacent to each other in the transport direction in the roller conveyor. The movable member is attached to the insert portion. The movable member is pressed upward by the support frame to enter the pressed state in response to the holder being lowered from the second position to the first position and is released from pressure from the support frame to enter the released state in response to the holder being raised from the first position to the second position.

In this structure, the restrictor switches from the closed state to the open state under a pressing force from the support frame on the movable member applied in response to the holder being lowered. The restrictor is switched from the open state to the closed state when no pressing force from the support frame is applied on the movable member in response to the holder being raised. No dedicated actuator is thus used to open and close the restrictor. This easily simplifies the holder and reduces the costs.

This structure with the movable member attached to the insert portion can leave a space, below the transport surface of the roller conveyor, for the movable member to come in contact with the support frame. This structure uses a known support frame to simplify a pressing assembly for pressing the movable member. This structure can easily reduce the size of the holder and the roller conveyor compared with a structure with a pressing assembly for pressing the movable member disposed outside the roller conveyor when viewed in the vertical direction.

As described above, this structure can appropriately transfer target objects with a simple structure.

Further aspects and features of the transporter will be apparent from exemplary and nonlimiting embodiments described below with reference to the drawings.

DESCRIPTION OF THE INVENTION

Figure 1:
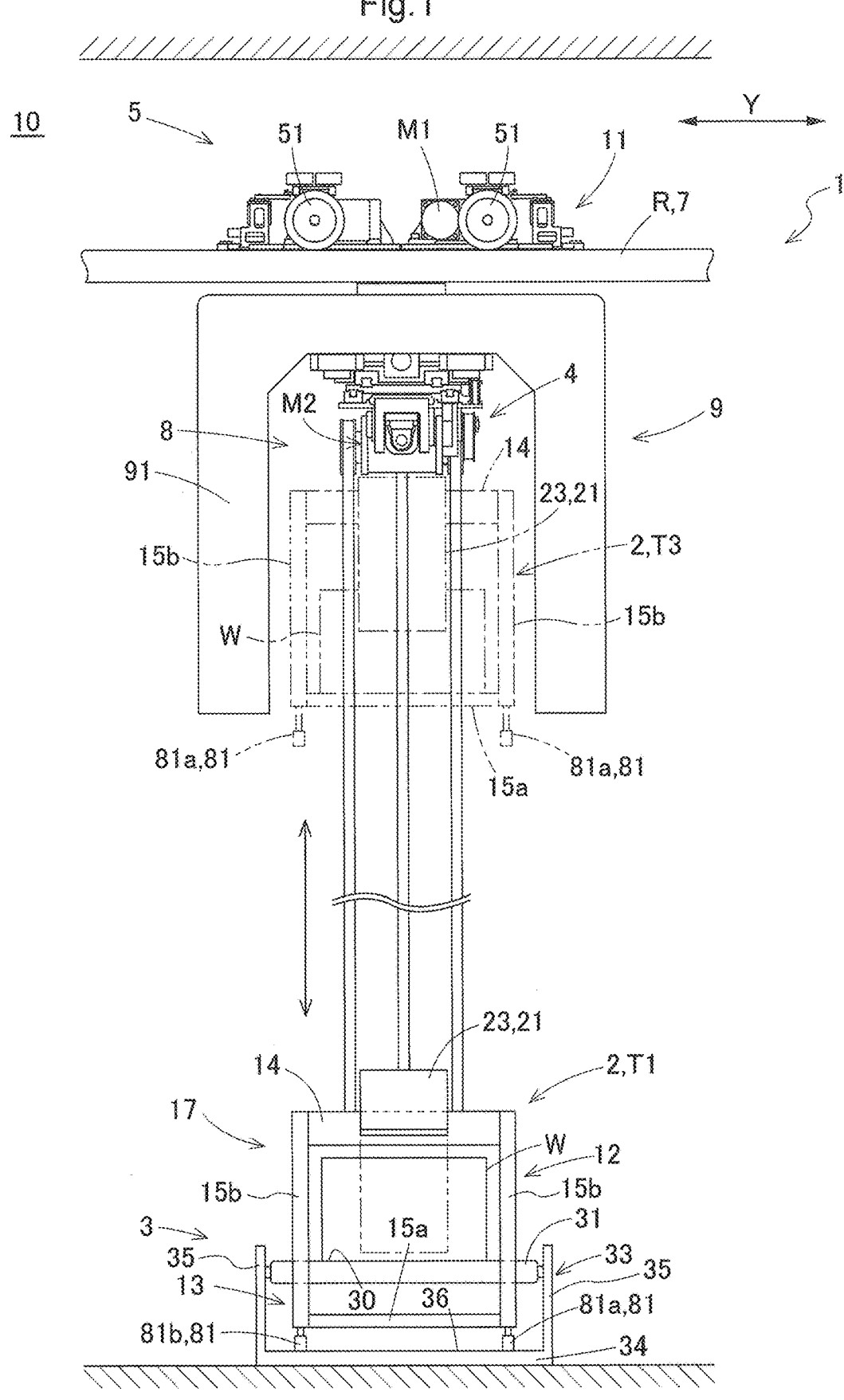
FIG. 1 is a schematic diagram of a transporter and a roller conveyor.

A transporter 1 according to one or more embodiments used in a transport facility 10 will be described with reference to the drawings. As shown in FIG. 1, the transport facility 10 includes the transporter 1 and a roller conveyor 3. The transporter 1 can transfer target objects W to and from the roller conveyor 3 including multiple rollers 31 and a support frame 33 supporting the rollers 31. In the present embodiment, the transporter 1 travels along a travel path 7 to transport target objects W. In this example, a target object W is, but not limited to, a monocrystal ingot for manufacturing a semiconductor material (silicon wafer). Hereafter, a direction in which the roller conveyor 3 transports a target object W is referred to as a transport direction X. A first side in the transport direction X is referred to as a first side X1 in the transport direction X, and a second side in the transport direction X is referred to as a second side X2 in the transport direction X. A direction perpendicular to the transport direction X when viewed in a vertical direction is referred to as a width direction Y.

Figure 3:
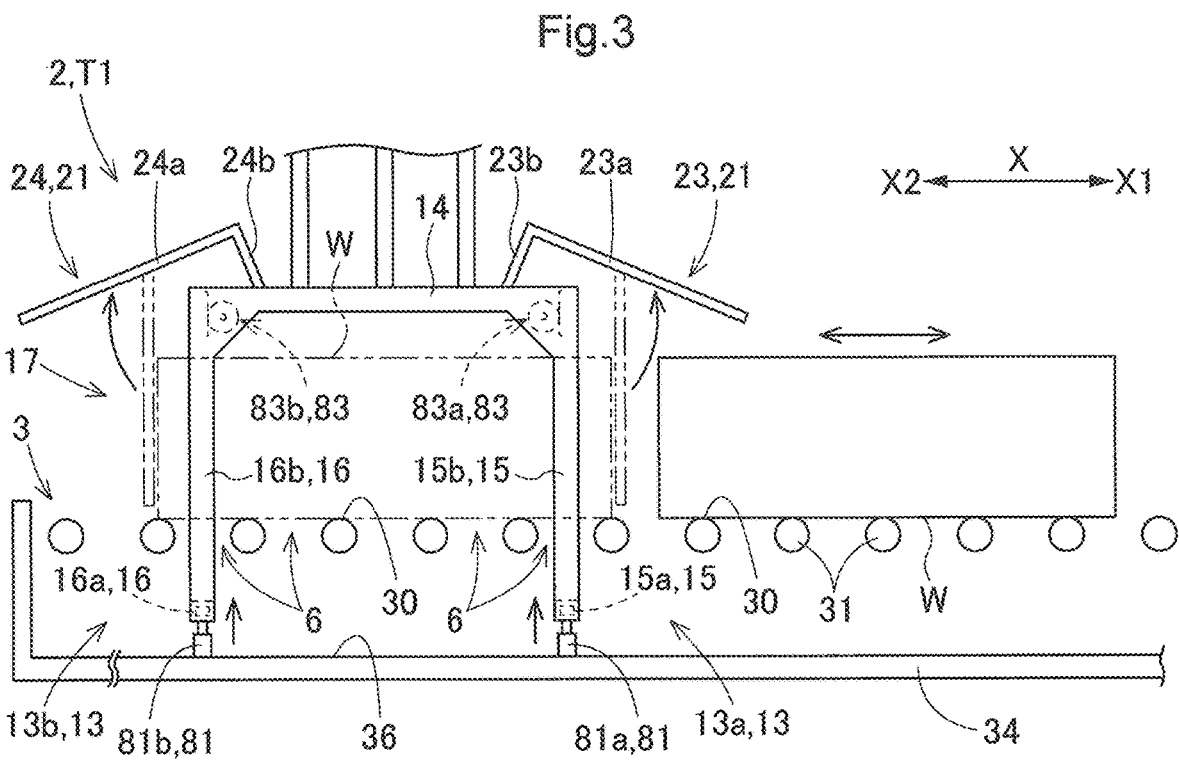
FIG. 3 is a schematic side view of a holder and the roller conveyor at a first position.

The rollers 31 extend in the width direction Y and are arranged in the transport direction X. Each roller 31 rotates about an axis extending in the width direction Y. The support frame 33 includes side walls 35 supporting rotational shafts of the rollers 31 and a bottom wall 34 disposed below the rollers 31. The side walls 35 are supported on the bottom wall 34. The side walls 35 as a pair are apart in the width direction Y. The rollers 31 are supported on the pair of side walls 35. The bottom wall 34 and the rollers 31 define a space between them in the vertical direction. As shown in FIG. 3, a clearance between each pair of the rollers 31 adjacent to each other in the transport direction X in the roller conveyor 3 is referred to as a roller clearance 6.

Figure 2:
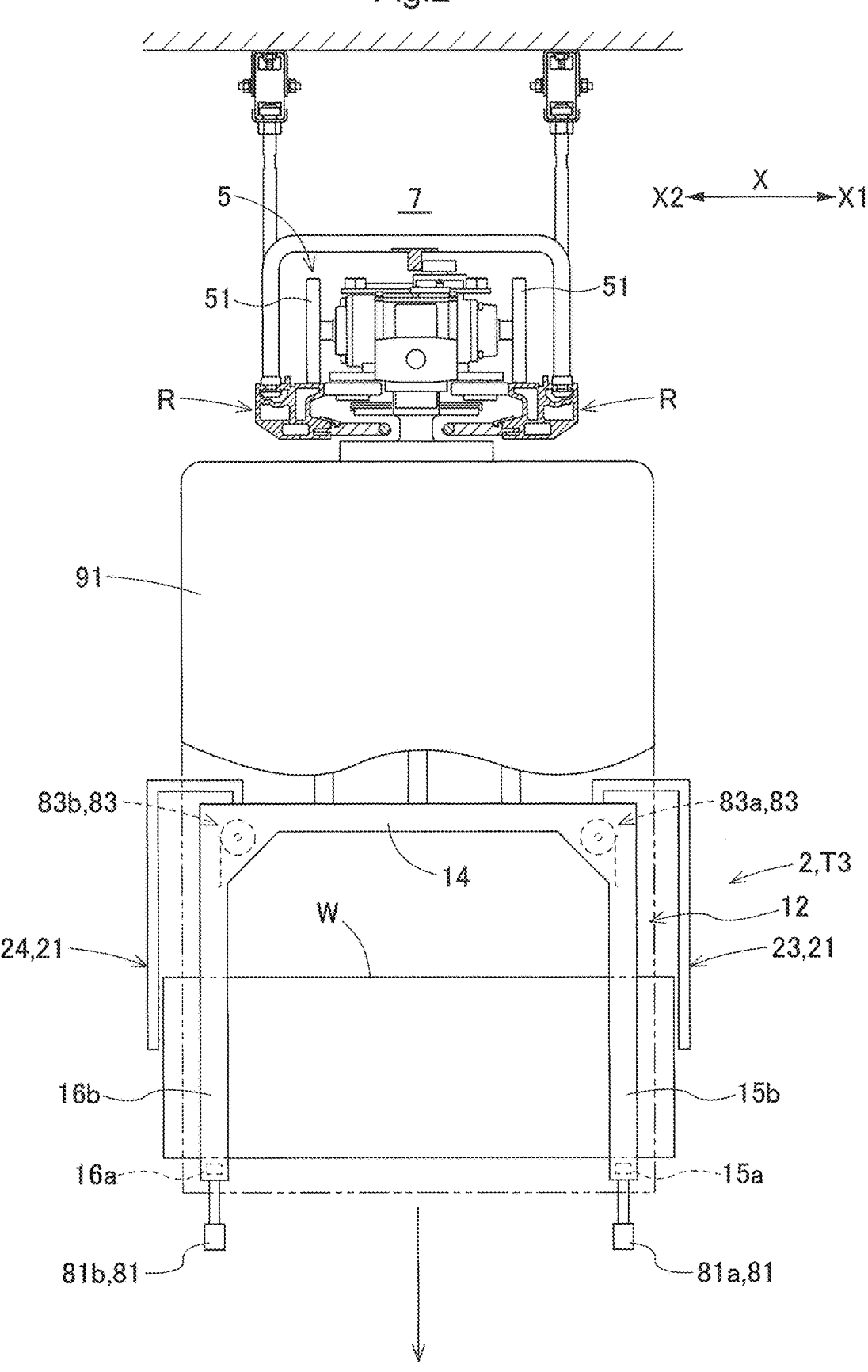
FIG. 2 is a schematic view (front view) of the transporter.

As shown in FIGS. 1 and 2, the transporter 1 includes a movable body 5 that is movable, a holder 2 that holds a target object W, and a lifter 4 that raises and lowers the holder 2 with the holder 2 suspended from the movable body 5. The movable body 5 travels along travel rails R extending along the travel path 7. In this example, the travel path 7 is defined along the ceiling, and the travel rails R are hung from the ceiling. In other words, the transporter 1 is, but not limited to, a ceiling-hung transport vehicle in this example. The transporter 1 may be an article transport vehicle that travels on the ground, or may be, for example, a travel carriage of a stacker crane. The transporter 1 may also be a tracked transport vehicle or a trackless transport vehicle such as an automated guided vehicle (AGV) or an autonomous mobile robot (AMR). In the illustrated example, the travel rails R extend in the width direction Y, and the roller conveyor 3 extends in the transport direction X. However, the travel rails R and the roller conveyor 3 may extend in the same direction.

The movable body 5 includes travel wheels 51 (multiple travel wheels 51 in this example) that roll on the upper surfaces of the travel rails R. The movable body 5 also includes a travel motor M1 that drives at least one of the travel wheels 51 to rotate. The rotation driven by the travel motor M1 propels the movable body 5 to travel on the travel rails R. The movable body 5 includes a pair of guide wheels freely rotatable about an axis extending in the vertical direction. The pair of guide wheels each roll on an inner side surface of the corresponding travel rail R.

Figure 4:
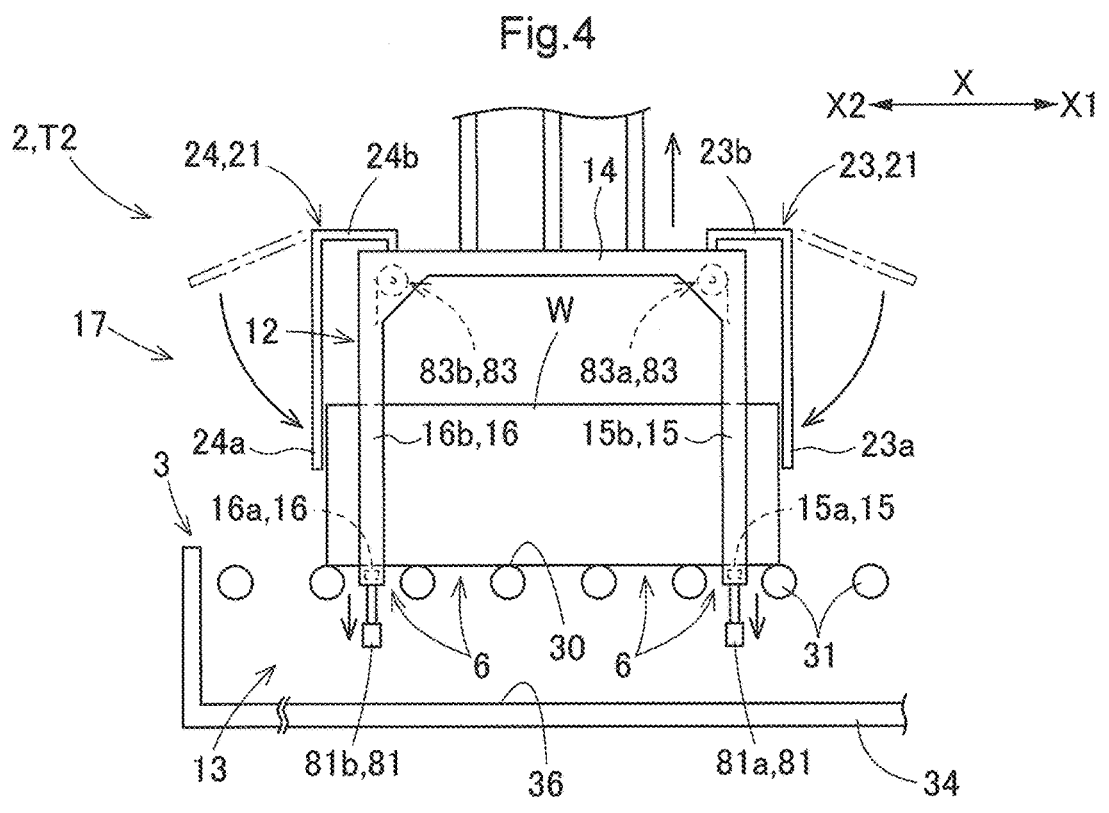
FIG. 4 is a schematic side view of the holder and the roller conveyor at a second position.

The lifter 4 is supported by the movable body 5. The lifter 4 is disposed below the travel rails R (below the movable body 5 across the travel rails R). The lifter 4 suspends the holder 2 and raises and lowers the holder 2 in the vertical direction. As shown in FIGS. 3 and 4, the lifter 4 can raise and lower the holder 2 to a first position T1 and to a second position T2 in the vertical direction. As shown in FIGS. 1 and 2, the lifter 4 can also support the holder 2 at an accommodated position T3. In other words, the lifter 4 can raise and lower the holder 2 between the accommodated position T3, the first position T1, and the second position T2. The holder 2 is at the accommodated position T3 while the movable body 5 is traveling. As shown in FIGS. 1 and 3, the target object W is loaded into and unloaded from the holder 2 by the roller conveyor 3 at the first position T1. As shown in FIG. 4, the second position T2 is above the first position T1. A support 12 supports or releases the target object W at the second position T2. In this example, the holder 2 is lowermost at the first position T1. The target object W supported by the holder 2 has, at the second position T2, a support surface at the same level as a transport surface 30 defined by the rollers 31. The lifter 4 includes a rotator (e.g., a drum), a wound member (e.g., a belt) windable around the rotator and connected to the holder 2 at its end, and a lift motor M2 (FIG. 2) for rotating the rotator to drive (more specifically, to wind or unwind) the wound member. The lifter 4 raises and lowers the holder 2 by rotating the rotator with a driving force from the lift motor M2.

The transporter 1 includes a compartment 9. In this example, the compartment 9 includes a compartment case 91 that accommodates the holder 2 at the accommodated position T3, the target object W held by the holder 2, and the lifter 4. The compartment case 91 covers these components from the two sides in the width direction Y and from above (FIG. 1). The holder 2 and the target object W held by the holder 2 are accommodated in the compartment 9 at the accommodated position T3.

As shown in FIGS. 1 to 5, the holder 2 includes the support 12 that supports the target object W, restrictors 21 that restrict the movement of the target object W being held in the transport direction X, and open-close assemblies 8 that open and close the restrictors 21. The support 12 supports the target object W from below. When the holder 2 is at the first position T1 or the second position T2, the support 12 is partially placeable through the roller clearances 6. In this example, the support 12 is connected to the lifter 4.

The support 12 includes a body 14 connected to the lifter 4, a first support 15 extending downward from the body 14, and a second support 16 spaced from the first support 15 on the second side X2 in the transport direction and extending downward from the body 14. The body 14 is a rectangular plate-like member extending in the transport direction X and the width direction Y when viewed in the vertical direction. The body 14 is fixed to the end of the wound member in the lifter 4. The first support 15 and the second support 16 are supported by the body 14 from above. The first support 15 and the second support 16 support the target object W in cooperation with each other. In this example, the first support 15 supports a portion of the target object W on the first side X1 in the transport direction X relative to a middle portion of the target object W in the transport direction X. The second support 16 supports a portion of the target object W on the second side X2 in the transport direction X relative to the middle portion of the target object W in the transport direction X.

The first support 15 includes a first contact member 15*a* and first connectors 15*b*. The first contact member 15*a* comes in contact with the lower surface of the target object W when supporting the target object W. The first connectors 15*b* connect the first contact member 15*a* to the body 14. The first connectors 15*b* as a pair are apart in the width direction Y. The first contact member 15*a* extends in the width direction Y and connects the lower ends of the first connectors 15*b* of the pair to each other. The second support 16 includes a second contact member 16*a* and second connectors 16*b*. The second contact member 16*a* comes in contact with the lower surface of the target object W when supporting the target object W. The second connectors 16*b* connect the second contact member 16*a* to the body 14. The second connectors 16*b* as a pair are also apart in the width direction Y. The second contact member 16*a* extends in the width direction Y and connects the lower ends of the second connectors 16*b* of the pair to each other.

In the illustrated example, the first contact member 15*a* and the second contact member 16*a* are at the same level in the vertical direction. The first contact member 15*a* and the second contact member 16*a* are spaced in the transport direction X and support the target object W from below. The pair of first connectors 15*b* extend downward from the end of the body 14 on the first side X1 in the transport direction. The pair of second connectors 16*b* extend downward from the end of the body 14 on the second side X2 in the transport direction. The distance between the first connectors 15*b* in the pair and the distance between the second connectors 16*b* in the pair each are greater than the dimension of the target object W in the width direction Y. The holder 2 is generally in the form of a rectangular prism, but the structure is not limited to this example. When the holder 2 is at the first position T1, the body 14 is above the movement path of the target object W transported by the roller conveyor 3 when viewed in the transport direction X, and the first contact member 15*a* and the second contact member 16*a* are below the transport surface 30. The pair of first connectors 15*b* and the pair of second connectors 16*b* are outward (outward in the width direction Y) from the movement path of the target object W. When the holder 2 is at the second position T2, the first contact member 15*a* and the second contact member 16*a* have their upper surfaces at the same level as the transport surface 30 of the roller conveyor 3 in the vertical direction, thus coming in contact with the target object W on the transport surface 30 from below.

Figure 5:
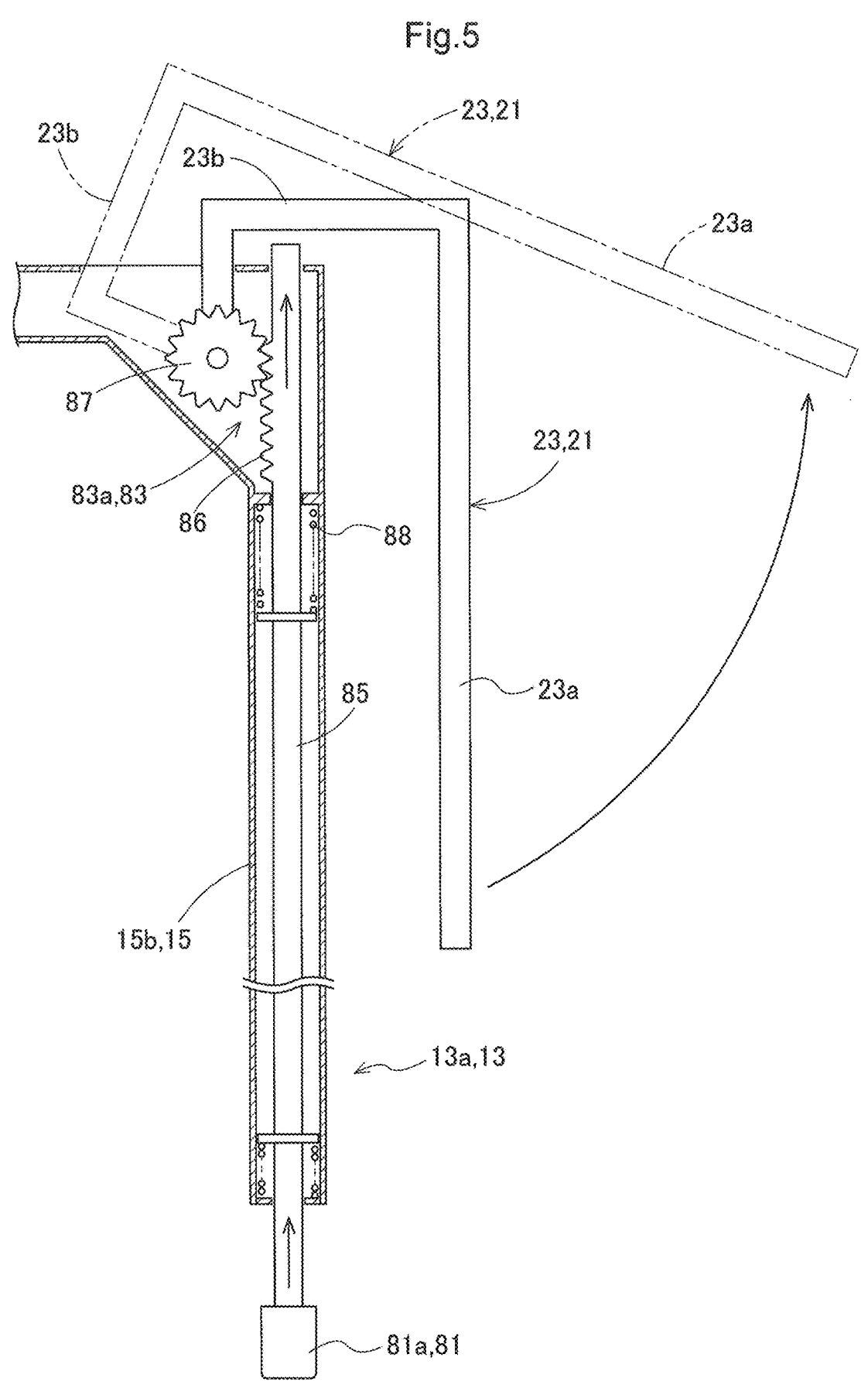
FIG. 5 is a schematic side view of an open-close assembly.

The support 12 includes insert portions 13 placeable, with the holder 2 at the first position T1, below the transport surface 30 of the roller conveyor 3 through roller clearances 6. The insert portions 13 refer to portions of the first support 15 and the second support 16 that are placeable, with the holder 2 at the first position T1, below the transport surface 30 excluding the first contact member 15*a* and second contact member 16*a*. The first support 15 includes first insert portions 13*a* as the insert portions 13. The second support 16 includes second insert portions 13*b* as the insert portions 13. The first insert portions 13*a* are on the respective first connectors 15*b* as a pair. The second insert portions 13*b* are on the respective second connectors 16*b* as a pair. The first insert portions 13*a* include portions of the first connectors 15*b* through a roller clearance 6, and the second insert portions 13*b* include portions of the second connectors 16*b* through another roller clearance 6. As shown in FIG. 5, the insert portions 13 are hollow. In this example, the first insert portions 13*a* and the second insert portions 13*b* are hollow. More specifically, the pair of first connectors 15*b* including the first insert portions 13*a* are generally hollow. Similarly, the pair of second connectors 16*b* including the second insert portions 13*b* are generally hollow. A portion of the support 12 upward from the transport surface 30 of the roller conveyor 3 when the holder 2 is at the first position T1 is hereafter referred to as an upper portion 17 (FIG. 3). The upper portion 17 herein refers to portions of the first connectors 15*b* and the second connectors 16*b* upward from the transport surface 30 when the holder 2 is at the first position T1, and the body 14.

As shown in FIG. 1, the restrictors 21 at least partially cover, among the surfaces of the target object W held in the holder 2, the surfaces facing in the transport direction X. The restrictors 21 are attached to the upper portion 17 to be open and closed above the transport surface 30 of the roller conveyor 3. In this example, the restrictors 21 are attached to the body 14. As shown in FIGS. 3 and 4, the restrictors 21 enter an open state in response to the holder 2 at the first position T1 and enter a closed state in response to the holder 2 at the second position T2. The restrictors 21 in the open state have no overlap with the movement path of the target object W transported by the roller conveyor 3 when viewed in the transport direction X. The restrictors 21 in the closed state have an overlap with the movement path of the target object W when viewed in the transport direction X. In the present embodiment, the holder 2 includes, as the restrictors 21, a first restrictor 23 that restricts movement of the target object W toward the first side X1 in the transport direction, and a second restrictor 24 that restricts movement of the target object W toward the second side X2 in the transport direction. The first restrictor 23 in the closed state at least partially covers the target object W from outside on the first side X1 in the transport direction when the target object W is supported by the support 12 (more specifically, by the first contact member 15*a* and the second contact member 16*a*). The second restrictor 24 in the closed state at least partially covers the target object W from outside on the second side X2 in the transport direction when the target object W is supported by the support 12. Thus, the target object W is restricted from moving toward either side in the transport direction X. The first restrictor 23 and the second restrictor 24 in the open state are above a space for accommodating the target object W in the support 12 (FIG. 3). Thus, the support 12 uncovers the target object W on both sides in the transport direction X. In other words, at the first position T1, the first restrictor 23 and the second restrictor 24 have no overlap with the movement path of the target object W when viewed in the transport direction X. Thus, at the first position T1, the target object W can be loaded into and unloaded from the holder 2 (support 12) by the roller conveyor 3.

In the illustrated example, the first restrictor 23 and the second restrictor 24 have the same structure. The first restrictor 23 includes a first restrictor body 23*a* and a first restrictor connector 23*b*. In the closed state, the first restrictor body 23*a* faces the target object W supported by the support 12 on the first side X1 in the transport direction. The first restrictor connector 23*b* connects the first restrictor body 23*a* to the corresponding open-close assembly 8. The second restrictor 24 includes a second restrictor body 24*a* and a second restrictor connector 24*b*. In the closed state, the second restrictor body 24a faces the target object W supported by the support 12 on the second side X2 in the transport direction. The second restrictor connector 24b connects the second restrictor body 24a to the corresponding open-close assembly 8. Each of the first restrictor body 23a and the second restrictor body 24a is a plate-like member extending in the vertical direction and in the width direction Y in the closed state. When switching from the closed state to the open state, the first restrictor body 23a and the second restrictor body 24a are each rotated by the corresponding open-close assembly 8 about a rotation axis extending in the horizontal direction (width direction Y), thus placed above the space for accommodating the target object W in the support 12.

As shown in FIG. 5, each open-close assembly 8 includes a movable member 81 and a linkage 83. The movable member 81 switches between, in response to the holder 2 being raised or lowered, a pressed state in which the movable member 81 is pressed by the support frame 33 and a released state in which the movable member 81 is released from pressure from the support frame 33. The linkage 83 links the movable member 81 and the corresponding restrictor 21 to cause the restrictor 21 to switch from the open state to the closed state in response to the movable member 81 switching from the pressed state to the released state and to cause the restrictor 21 to switch from the closed state to the open state in response to the movable member 81 switching from the released state to the pressed state. In the present embodiment, each open-close assembly 8 includes a first movable member 81a and a second movable member 81b each as the movable member 81. Each open-close assembly 8 includes, as the linkage 83, a first linkages 83a that links the first movable member 81a to the first restrictor 23, and a second linkage 83b that links the second movable member 81b to the second restrictor 24.

Each movable member 81 is attached to the corresponding insert portion 13, and is pressed upward by the support frame 33 to enter a pressed state in response to the holder 2 being lowered from the second position T2 to the first position T1. The movable member 81 is released from the pressure from the support frame 33 to enter a released state in response to the holder 2 being raised from the first position T1 to the second position T2. Each movable member 81 is supported in a manner movable relative to the corresponding insert portion 13 in the vertical direction and at least partially protrudes downward from the insert portion 13. The movable member 81 is movable toward a surface 36 of the support frame 33 facing upward from above and is pressed against the support frame 33 to enter the pressed state. Each first movable member 81a protrudes downward from the lower end of the corresponding first insert portion 13a. Similarly, each second movable member 81b protrudes downward from the lower end of the corresponding second insert portion 13b. In this example, the first movable members 81a as a pair protrude downward from the lower ends of the respective first connectors 15b of the pair. The second movable members 81b as a pair protrude downward from the lower ends of the respective second connectors 16b of the pair. As shown in FIG. 3, the first movable members 81a and the second movable members 81b are in contact with the upward-facing surface 36 of the bottom wall 34 of the roller conveyor 3 when the holder 2 is at the first position T1. The first movable members 81a are partially pushed into the first insert portions 13a (inside the first connectors 15b) under a pressing force from the bottom wall 34 (in reaction to a pressing force from the first insert portions 13a applied to the bottom wall 34 through the first movable members 81a).

Similarly, the second movable members 81b are partially pushed into the second insert portions 13b (inside of the second connectors 16b) under a pressing force from the bottom wall 34. Thus, the first movable members 81a and the second movable members 81b enter the pressed state. This causes the linkages 83 (the first linkages 83a and the second linkages 83b) to switch the first restrictor 23 and the second restrictor 24 from the closed state to the open state. In the present embodiment, the first restrictor 23 and the second restrictor 24 are constantly in the closed state when the holder 2 is at any vertical position other than the first position T1.

The first linkages 83a as a pair correspond to the pair of first connectors 15b. Similarly, the second linkages 83b as a pair correspond to the pair of second connectors 16b. The first linkages 83a and the second linkages 83b have the same structure. Thus, the structure of the first linkages 83a will be described below and the structure of the second linkages 83b will not be described.

As shown in FIG. 5, each linkage 83 is at least partially disposed inside the insert portion 13. In this example, the first linkage 83a is disposed inside the first connector 15b including the first insert portion 13a. The first linkage 83a includes a shaft 85, a rack gear 86, and a pinion gear 87. The shaft 85 extends in the vertical direction. The rack gear 86 is at the upper end of the shaft 85. In the illustrated example, an urging member 88 is disposed for urging the shaft 85 downward relative to the first connector 15b. The first movable member 81a is attached to the lower end of the shaft 85. The pinion gear 87 is attached to the first restrictor connector 23b. The pinion gear 87 can mesh with the rack gear 86. As shown in FIG. 3, when the first movable member 81a comes in contact with the bottom wall 34 at the first position T1 in response to the first connector 15b being lowered, the first movable member 81a is partially pushed into the first insert portion 13a (inside of the first connector 15b) under the pressure from the bottom wall 34 (pressed state). This raises the shaft 85 and the rack gear 86 and rotates the pinion gear 87, causing the first restrictor connector 23b to rotate (about an axis extending in the width direction Y in this example). This switches the first restrictor body 23a from the closed state to the open state (FIGS. 3 and 5). In response to the first connector 15b being raised from the first position T1, the first movable member 81a that has been partially pushed into the first connector 15b is pushed out of the first connector 15b and is lowered under the torque on the pinion gear 87 resulting from the weight of the first restrictor 23, the weight of the shaft 85, and an urging force from the urging member 88 (released state). The downward movement of the shaft 85 rotates the pinion gear 87 and causes the first restrictor connector 23b to rotate, switching the first restrictor body 23a from the open state to the closed state. As described above, in this example, a rack and a pinion are used as the linkage 83, but the structure is not limited to this example. For example, a cam assembly may also be used. When the open-close assembly 8 has the different structure, the restrictor 21 may also have a different structure as appropriate.

Figure 6:
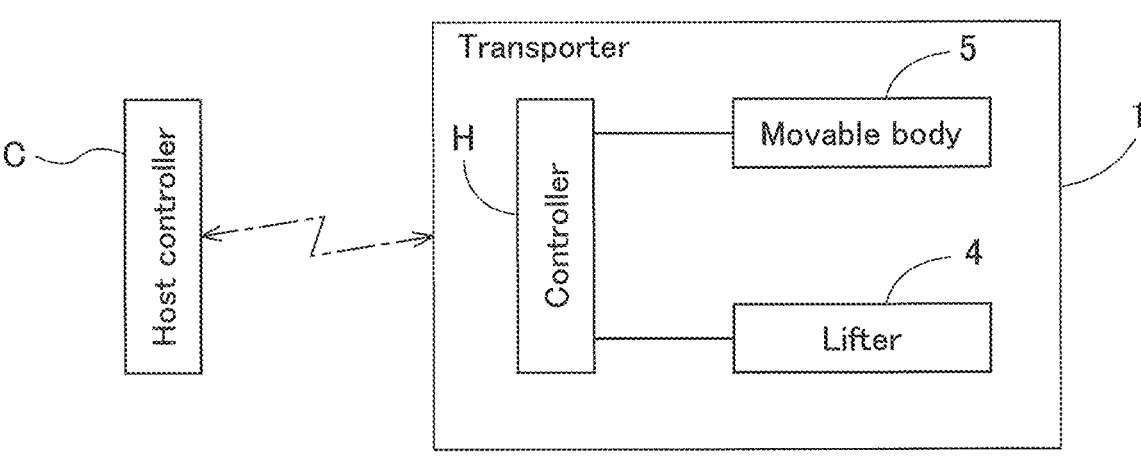
FIG. 6 is a control block diagram.

As shown in FIG. 6, the transporter 1 further includes a controller H. The controller H controls the movable body 5 and the lifter 4, and can communicate with a host controller C that controls the entire transport facility 10. The controller H and the host controller C each include, for example, a processor such as a microcomputer and peripheral circuitry including a memory. The functions of the components are implemented by the above hardware and a program executable on a processor such as a computer operating in cooperation with each other. In the present embodiment, the holder 2 uses no electric actuator. Thus, the controller H does not control the holder 2.

The control of transferring the target object W from the transporter 1 to the roller conveyor 3 will now be described. The controller H causes the movable body 5 to travel to a position corresponding to a transfer area (an area specified on the transport surface 30 of the roller conveyor 3) in accordance to a transfer command received from the host controller C. The controller H then controls the lifter 4 to lower the holder 2 holding the target object W from the accommodated position T3 to the first position T1.

As the holder 2 is lowered, the first connectors 15b, the second connectors 16b, the first contact member 15a, and the second contact member 16a are placed through the roller clearances 6 immediately below. When the holder 2 reaches the second position T2, the target object W supported by the first contact member 15a and the second contact member 16a is transferred to the transport surface 30 of the roller conveyor 3. In other words, the target object W is supported on the transport surface 30. The controller H continues to lower the holder 2. When the holder 2 reaches the first position T1, the first movable members 81a are pushed into the first insert portions 13a (first connectors 15b), and the second movable members 81b are pushed into the second insert portions 13b (second connectors 16b) as described above. This switches the first restrictor 23 and the second restrictor 24 from the closed state to the open state. The host controller C then controls the roller conveyor 3 to transport the target object W on the transport surface 30 in the transport direction X (in this example, from the second side X2 to the first side X1 in the transport direction). The target object W passes through a space between the pair of first connectors 15b and moves downstream in the transport direction X (toward the first side X1 in the transport direction). The controller H can determine the vertical position of the holder 2 using, for example, a distance sensor or an optical sensor.

To transfer the target object W from the roller conveyor 3 to the holder 2 for transportation, the controller H controls the lifter 4 and the movable body 5 to operate in an order reverse to the above. In this case, the target object W on the transport surface 30 is picked up by the holder 2 at the second position T2. The controller H first controls the lifter 4 to raise the holder 2 from the first position T1. The first movable members 81a are then partially pushed out of the first insert portions 13a (first connectors 15b) under their weights and enter the released state. The second movable members 81b are also partially pushed out of the second insert portions 13b (second connectors 16b) under their weights and enter the released state. This switches the first restrictor 23 and the second restrictor 24 from the open state to the closed state. When the holder 2 reaches the second position T2, the target object W on the transport surface 30 of the roller conveyor 3 is transferred onto the first contact member 15a and the second contact member 16a. In other words, the target object W is supported by the first contact member 15a and the second contact member 16a. The controller H continues to raise the holder 2 to the accommodated position T3. The controller H then causes the movable body 5 to travel in accordance with a transport command from the host controller C.

Other Embodiments

Transporters according to other embodiments will now be described.

(1) In the above embodiment, the holder 2 includes the first restrictor 23 and the second restrictor 24 apart in the transport direction X. However, the structure is not limited to this example. The holder 2 may include either the first restrictor 23 or the second restrictor 24 alone. When the target object W is transferred between the roller conveyor 3 and the holder 2 on a predetermined side in the transport direction X, either the first restrictor 23 or the second restrictor 24 alone may switch between the open state and the closed state, whereas the other restrictor may be fixed in the closed state. In the above embodiment, the target object W is supported by both the first contact member 15a and the second contact member 16a in the holder 2. However, the structure is not limited to this example. For example, the support 12 may include the first contact member 15a alone in the holder 2, and the target object W may be supported by the first contact member 15a alone. As described above, the structure of the holder 2 may be changed as appropriate for the shape and size of the target object W and the structure of the roller conveyor 3.

Figure 7:
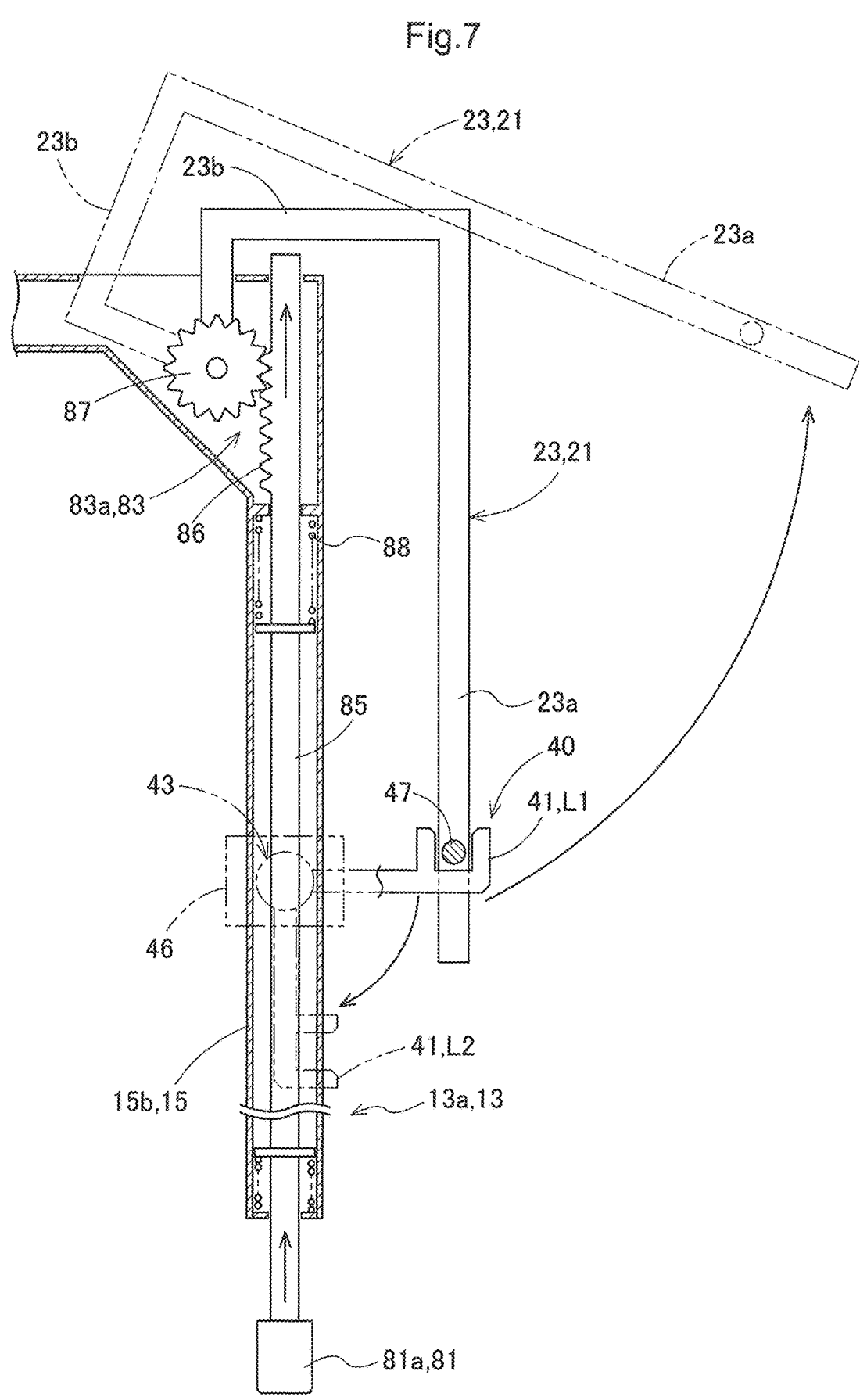
FIG. 7 is a schematic side view of a lock assembly.

(2) In the above embodiment, the holder 2 includes the support 12 that supports the target object W, the restrictors 21 that restrict the movement of the target object W being held in the transport direction X, and the open-close assemblies 8 that open and close the restrictors 21. However, the structure is not limited to this example. The holder 2 may further include lock assemblies 40 that restrict the restrictors 21 from switching from the closed state to the open state. Such an example is shown in FIG. 7. As shown in FIG. 7, each lock assembly 40 includes an engagement member 47 disposed on the restrictor 21, an engagement receiver 41 engageable with the engagement member 47, and a mover 43 that switches the engagement receiver 41 between an engaged position L1 and a disengaged position L2. The engagement member 47 is fixed to a side surface of the restrictor 21. In this example, the engagement member 47 is disposed on a side surface (facing in the width direction Y) of each of the first restrictor body 23a and the second restrictor body 24a. The engagement receiver 41 is at the disengaged position L2 when the restrictor 21 is in the open state. The engagement receiver 41 is at the engaged position L1 when the restrictor 21 is in the closed state. At the engaged position L1, the engagement receiver 41 engages with the engagement member 47 on the restrictor 21 in the closed state. In the illustrated example, the engagement receiver 41 engages with the engagement member 47 from below. In some embodiments, the engagement receiver 41 may engage with the engagement member 47 from above. The engagement receiver 41 is rotatable about an axis extending in the width direction Y with the mover 43. In this example, the mover 43 is connected to the linkage 83. The mover 43 may include, for example, a rack gear disposed on the shaft 85 or multiple pinion gears. In the illustrated example, the mover 43 is at least partially accommodated in a box 46 in the first connector 15b. The mover 43 rotates the engagement receiver 41 from the disengaged position L2 to the engaged position L1 in response to the movable member 81 switching from the pressed state to the released state. In this example, the basal end of the engagement receiver 41 is connected to the mover 43. In the illustrated example, the engagement receiver 41 includes a rotation axis at its basal end. At the disengaged position L2, the engagement receiver 41 extends in the vertical direction. However, the structure is not limited to this example. As described above, the mover 43 is connected to the linkage 83, eliminating a drive such as an electric motor to rotate the engagement receiver 41. Thus, with a relatively simple structure, the restrictors 21 can be prevented from, for example, accidentally switching to the open state during transportation of the target object W. The lock assembly 40 may include a drive such as an electric motor. The lock assembly 40 may be an electromagnetic lock that restricts the restrictor 21 from switching from the closed state to the open state. In this example, the lock assembly 40 is disposed for each of the first restrictor 23 and the second restrictor 24. However, the structure is not limited to this example.

(3) In the above embodiment, each linkage 83 is at least partially disposed inside the corresponding insert portion 13. However, the structure is not limited to this example. For example, the linkage 83 may be fully disposed outside the corresponding insert portion 13. For example, the linkage 83 may be disposed adjacent to the insert portion 13 inward in the width direction Y relative to the insert portion 13 to allow the linkage 83 to pass through a roller clearance 6. The holder 2 is thus less likely to be larger.

(4) In the above embodiment, each restrictor 21 is a plate-like member (a plate-like member extending in the vertical direction and the width direction Y in the closed state) attached to the upper portion 17. However, the structure is not limited to this example. Each restrictor 21 may be a member in any shape other than a plate that can restrict the movement of the target object W in the transport direction X in the closed state.

(5) In the above embodiment, each movable member 81 is supported in a manner movable relative to the corresponding insert portion 13 in the vertical direction and at least partially protrudes downward from the insert portion 13. However, the structure is not limited to this example. Each movable member 81 may be supported in a manner movable relative to the corresponding insert portion 13 in the horizontal direction (e.g., in the width direction Y in which the rollers 31 extend). In this case, the roller conveyor 3, for example, may include an assembly for moving the movable members 81 in the horizontal direction to be partially pushed into the insert portions 13 at the first position T1.

(6) The structure described in each of the above embodiments may be combined with any other structures described in the other embodiments unless any contradiction arises. For other structures as well, the embodiments described herein are merely illustrative in all aspects. Thus, the embodiments described herein may be modified variously as appropriate without departing from the spirit and scope of the disclosure.

Overview of Embodiments

An overview of the transporter described above is provided below.

A transporter according to an embodiment of the disclosure is a transporter for transferring a target object to and from a roller conveyor including a plurality of rollers and a support frame supporting the plurality of rollers. The transporter includes a movable body being movable, a holder that holds the target object, and a lifter that raises and lowers the holder with the holder being suspended from the movable body. The holder includes a support that supports the target object, a restrictor that restricts movement of the target object being held in a transport direction in which the roller conveyor transports the target object, and an open-close assembly that opens and closes the restrictor. The lifter raises and lowers the holder in a vertical direction to a first position at which the target object is loaded into and unloaded from the holder by the roller conveyor and to a second position at which the support supports or releases the target object. The second position is above the first position. The restrictor enters an open state in response to the holder at the first position and enters a closed state in response to the holder at the second position. The restrictor in the open state has no overlap with a movement path of the target object transported by the roller conveyor when viewed in the transport direction. The restrictor in the closed state has an overlap with the movement path of the target object when viewed in the transport direction. The open-close assembly includes a movable member and a linkage. The movable member switches between, in response to the holder being raised or lowered, a pressed state in which the movable member is pressed by the support frame and a released state in which the movable member is released from pressure from the support frame. The linkage links the movable member and the restrictor to cause the restrictor to switch from the open state to the closed state in response to the movable member switching from the pressed state to the released state and to cause the restrictor to switch from the closed state to the open state in response to the movable member switching from the released state to the pressed state. The support includes an insert portion placeable, with the holder at the first position, below a transport surface of the roller conveyor through a roller clearance between a pair of rollers, among the plurality of rollers, adjacent to each other in the transport direction in the roller conveyor. The movable member is attached to the insert portion. The movable member is pressed upward by the support frame to enter the pressed state in response to the holder being lowered from the second position to the first position and is released from pressure from the support frame to enter the released state in response to the holder being raised from the first position to the second position.

In this structure, the restrictor switches from the closed state to the open state under a pressing force from the support frame on the movable member applied in response to the holder being lowered. The restrictor is switched from the open state to the closed state when no pressing force from the support frame is applied on the movable member in response to the holder being raised. No dedicated actuator is thus used to open and close the restrictor. This easily simplifies the holder and reduces the costs.

This structure with the movable member attached to the insert portion can leave a space, below the transport surface of the roller conveyor, for the movable member to come in contact with the support frame. This structure uses a known support frame to simplify a pressing assembly for pressing the movable member. This structure can easily reduce the size of the holder and the roller conveyor compared with a structure with a pressing assembly for pressing the movable member disposed outside the roller conveyor when viewed in the vertical direction.

As described above, this structure can appropriately transfer target objects with a simple structure.

The insert portion may be hollow. The linkage may be at least partially disposed inside the insert portion.

This structure with the linkage assembly arranged at least partially inside the insert portion allows the holder to be compact, as well as prevents the linkage assembly from interfering with the rollers of the roller conveyor when the insert portion is placed in the roller clearance.

The support may have an upper portion disposed upward from the transport surface of the roller conveyor when the holder is at the first position. The restrictor may be attached to the upper portion to be open and closed above the transport surface of the roller conveyor.

In this structure, the restrictor is attached to the support at a position above the transport surface of the roller conveyor, and is open and closed above the transport surface of the roller conveyor. Thus, avoiding interference between the restrictor and the roller conveyor is not to be considered. This increases flexibility in the shape and positioning of the restrictor.

The movable member may be supported in a manner movable relative to the insert portion in the vertical direction and at least partially protrude downward from the insert portion. The movable member may be movable toward a surface of the support frame facing upward from above and may be pressed against the support frame to enter the pressed state.

In this structure, the movable member is unlikely to protrude laterally from the insert portion. This allows the width of the insert portion including the movable member to be smaller. Thus, the insert portion and the movable member are unlikely to interfere with the rollers of the roller conveyor when the insert portion is placed in roller clearance.

The transporter according to one or more embodiments of the disclosure produces at least one of the effects described above.

What is claimed is:

1. A transporter for transferring a target object to and from a roller conveyor comprising a plurality of rollers and a support frame supporting the plurality of rollers, the transporter comprising:

a movable body;

a holder configured to hold the target object; and a lifter configured to raise and lower the holder with the holder being suspended from the movable body, and wherein:

the holder comprises a support configured to support the target object, a restrictor configured to restrict movement of the target object being held in a transport direction in which the roller conveyor transports the target object, and an open-close assembly configured to open and close the restrictor, the lifter is configured to raise and lower the holder in a vertical direction to a first position at which the target object is loaded into and unloaded from the holder by the roller conveyor and to a second position at which the support supports or releases the target object, with the second position located above the first position, the restrictor is configured to enter an open state in response to the holder at the first position and to enter a closed state in response to the holder at the second position, the restrictor in the open state having no overlap with a movement path of the target object transported by the roller conveyor when viewed in the transport direction, the restrictor in the closed state having an overlap with the movement path of the target object when viewed in the transport direction, the open-close assembly comprises a movable member and a linkage, the movable member configured to switch between, in response to the holder being raised or lowered, a pressed state in which the movable member is pressed by the support frame and a released state in which the movable member is released from pressure from the support frame, the linkage linking the movable member and the restrictor to cause the restrictor to switch from the open state to the closed state in response to the movable member switching from the pressed state to the released state and to cause the restrictor to switch from the closed state to the open state in response to the movable member switching from the released state to the pressed state, the support comprises an insert portion placeable, with the holder at the first position, below a transport surface of the roller conveyor through a roller clearance between a pair of rollers, among the plurality of rollers, adjacent to each other in the transport direction in the roller conveyor, and the movable member is attached to the insert portion, with the movable member configured to be pressed upward by the support frame to enter the pressed state in response to the holder being lowered from the second position to the first position and configured to be released from pressure from the support frame to enter the released state in response to the holder being raised from the first position to the second position.

2. The transporter according to claim 1, wherein:

the insert portion is hollow, and the linkage is at least partially disposed inside the insert portion.

3. The transporter according to claim 1, wherein:

the support has an upper portion disposed upward from the transport surface of the roller conveyor when the holder is at the first position, and the restrictor is attached to the upper portion to be open and closed above the transport surface of the roller conveyor.

4. The transporter according to claim 1, wherein:

the movable member is supported in a manner movable relative to the insert portion in the vertical direction and at least partially protrudes downward from the insert portion, and the movable member is movable toward a surface of the support frame facing upward from above and is pressed against the support frame to enter the pressed state.

* * * * *